United States Patent
Choo et al.

(10) Patent No.: US 10,270,111 B2
(45) Date of Patent: Apr. 23, 2019

(54) METHOD FOR ACCELERATING ACTIVATION OF FUEL CELL STACK

(71) Applicant: HYUNDAI MOTOR COMPANY, Seoul (KR)

(72) Inventors: Hyun Suk Choo, Yongin-si (KR); Sung Keun Lee, Suwon-si (KR); Dae Keun Chun, Seoul (KR); Hwan Soo Shin, Uiwang-si (KR); Jae Hyuk Lee, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 604 days.

(21) Appl. No.: 14/954,883

(22) Filed: Nov. 30, 2015

(65) Prior Publication Data

US 2016/0336612 A1    Nov. 17, 2016

(30) Foreign Application Priority Data

May 15, 2015 (KR) ........................ 10-2015-0067893

(51) Int. Cl.
*H01M 8/04955* (2016.01)
*H01M 8/04223* (2016.01)
*H01M 8/04303* (2016.01)

(52) U.S. Cl.
CPC ... *H01M 8/04955* (2013.01); *H01M 8/04231* (2013.01); *H01M 8/04303* (2016.02)

(58) Field of Classification Search
CPC ......... H01M 8/04955; H01M 8/04303; H01M 8/04231
See application file for complete search history.

(56) References Cited

FOREIGN PATENT DOCUMENTS

| CN | 104577161 | * | 4/2015 |
|---|---|---|---|
| JP | 2010-272362 A | | 12/2010 |
| JP | 2012-049137 A | | 3/2012 |
| JP | 2013-038032 A | | 2/2013 |
| KR | 10-2011-0060035 A | | 6/2011 |
| KR | 20110060035 | * | 8/2011 |
| KR | 10-2013-0010414 A | | 1/2013 |
| KR | 10-1315762 B1 | | 10/2013 |
| KR | 10-2014-0076255 A | | 6/2014 |
| KR | 20140076255 | * | 6/2014 |
| KR | 10-2015-0043181 A | | 4/2015 |
| KR | 20150043181 | * | 4/2015 |

* cited by examiner

*Primary Examiner* — Ula C Ruddock
*Assistant Examiner* — Thomas H. Parsons
(74) *Attorney, Agent, or Firm* — Morgan Lewis & Bockius LLP

(57) ABSTRACT

A method for accelerating activation of a fuel cell stack may shorten an activation time of the fuel cell stack and reduce the amount of hydrogen used. The method includes a process of applying a high current to the fuel cell stack for a prescribed amount of time and a shutdown maintenance process of pumping hydrogen to an air electrode reaction surface for a prescribed amount of time.

10 Claims, 4 Drawing Sheets

METHOD FOR ACCELERATING ACTIVATION OF FUEL CELL STACK

CROSS-REFERENCE TO RELATED APPLICATION

This application claims under 35 U.S.C. § 119(a) the benefit of priority to Korean Patent Application No. 10-2015-0067893 filed on May 15, 2015, the entire content of which is incorporated herein by reference.

TECHNICAL FIELD

The present disclosure relates to a method for accelerating activation of a fuel cell stack. More particularly, the present disclosure relates to a method for accelerating activation of a fuel cell stack, which may reduce an activation time of the fuel cell stack and the amount of hydrogen used.

BACKGROUND

A fuel cell stack has a structure in which several tens to several hundreds of unit cells are stacked. Each unit cell includes a polymer electrolyte membrane which moves a hydrogen cation (proton). An air electrode (cathode) and a fuel electrode (anode) are applied to both surfaces of the electrolyte membrane as catalyst layers such that hydrogen may react with oxygen. A gas diffusion layer is stacked outside the air electrode and the fuel electrode. A bipolar plate is stacked outside the gas diffusion layer to supply fuel and discharge water through a flow channel.

During an initial operation of the fuel cell stack after being assembled, activity of the fuel cell stack is reduced in an electrochemical reaction. Accordingly, it is necessary to perform a stack activation process in order to maximize the initial performance.

This stack activation process is also called "pre-conditioning" or "break-in", which activates a catalyst that does not react and secures a hydrogen ion channel by sufficiently hydrating electrolytes contained in the electrolyte membrane and electrodes.

In order for the fuel cell stack to exhibit a normal performance after being assembled, the stack activation process is performed for securing a three-phase electrode reaction area, removing impurities from the polymer electrolyte membrane or electrodes, and improving ionic conductivity of the polymer electrolyte membrane.

For example, in a conventional method for stack activation, a process of discharging a high-current density (1.2 or 1.4 A/cm$^2$) for a prescribed amount of time (minutes) and a process in which pulse discharge is performed in a shutdown state for a prescribed amount of time are repeated several tens of times. However, the activation process through the pulse discharge has a problem in that the amount of hydrogen used therein as well as the processing time increases.

In order to resolve this problem, a method for activating a fuel cell stack using vacuum wetting has been proposed. In the method for activating a fuel cell stack using vacuum wetting, a process of discharging a high-current density and a vacuum wetting process in which a vacuum is generated in the fuel cell stack in a shutdown state are alternately repeated several times to several tens of times.

The above method may reduce the time required for activation and the amount of hydrogen used, compared to an activation method performed using only an existing constant current or electric potential, but due to limitations of activation equipment for stack activation (including an electronic load), the amount of time during which the activation equipment has to be used is relatively long.

Consequently, when production of fuel cell stacks increases in the future, the stack activation may delay a production time of the fuel cell stacks due to the limitations of the activation equipment. Accordingly, there exists a need for an activation process that can accelerate the activation time of fuel cell stack, and simultaneously, reduce the amount of hydrogen used for activation in order to prepare for the mass production of fuel cell vehicles.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

In one aspect, the present disclosure provides a method for accelerating activation of a fuel cell stack, which may further reduce an activation time of the fuel cell stack and thus reduce the amount of hydrogen used for the activation, by accelerating a vacuum pulse activation process including a process of discharging a high-current density and a shutdown process.

According to an exemplary embodiment of the present inventive concept, a method for accelerating activation of a fuel cell stack, in which a process of applying a high current to a fuel cell stack for a prescribed amount of time and a shutdown maintenance process of pumping hydrogen to an air electrode reaction surface for a prescribed amount of time are repeated plural times.

The process of applying the high current to the fuel cell stack and the shutdown maintenance process of pumping the hydrogen to the air electrode reaction surface may be performed for a shorter period of time in an initial stage of the stack activation, and then performed for a longer period of time by gradually increasing the time in a later stage of the stack activation.

The process of applying the high current to the fuel cell stack and the shutdown maintenance process of pumping the hydrogen to the air electrode reaction surface may be performed for 3 to 5 seconds in an initial stage of the stack activation, and then performed for 65 to 75 seconds by gradually increasing the time in a later stage of the stack activation.

The shutdown maintenance process may include a process of shutting off supply of oxygen to an air electrode and simultaneously supplying hydrogen to a fuel electrode in a shutdown state of the fuel cell stack, a reaction process ($H_2 \rightarrow 2H^+ + 2e^-$) in which the hydrogen is dissociated into hydrogen cations and electrons in the fuel electrode, and a reaction process ($2H^+ + 2e^- \rightarrow H_2$) in which the dissociated hydrogen ions are transmitted to the air electrode through an electrolyte membrane and at the same time bonded to the electrons transmitted to the air electrode through an external conducting wire to produce hydrogen in the air electrode.

The hydrogen may be pumped to the air electrode by the shutdown maintenance process, so that a hydrogen reduction atmosphere is formed, and oxides may be removed from a surface of platinum contained in the air electrode by the hydrogen reduction atmosphere when a prescribed load is constantly applied to the fuel cell stack.

In the shutdown maintenance process, a hydrogen pressurization method, in which hydrogen is supplied at a higher pressure than a threshold pressure, may be used in order to remove oxygen remaining in an air electrode.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure

Figure 1:
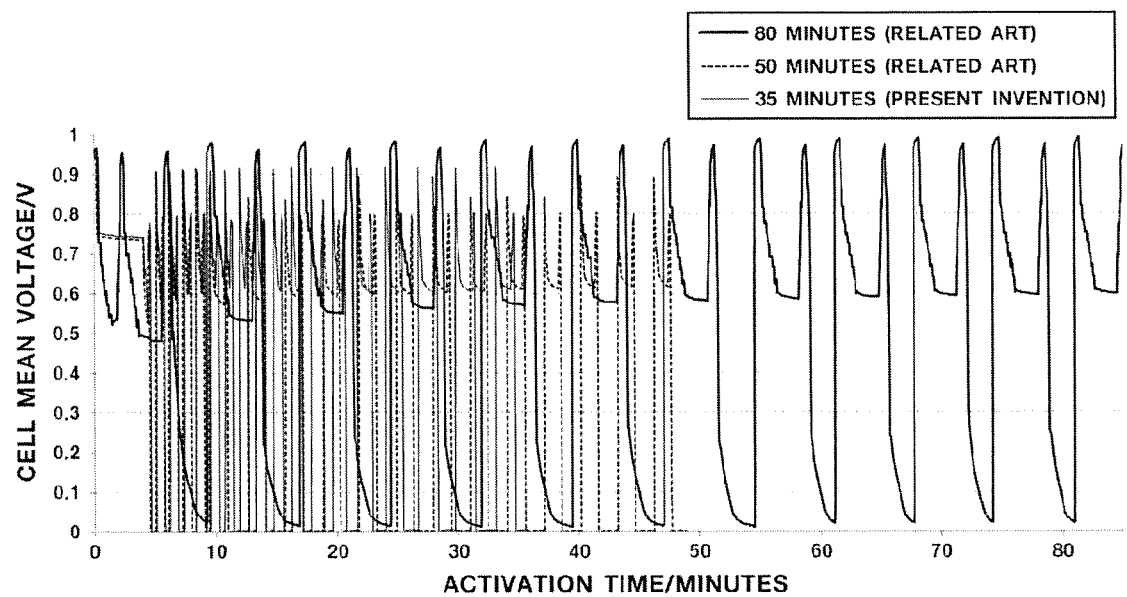
FIG. 1 is a graph comparing cell mean voltages during activation in a method for accelerating activation of a fuel cell stack according to an embodiment of the present inventive concept and a conventional activation method.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

The present disclosure is aimed at, after mounting a fuel cell stack to predetermined activation equipment, repeating a process of applying a high current to the fuel cell stack and a process of shutting down the fuel cell stack, and introducing a process of pumping hydrogen to an air electrode reaction surface of the fuel cell stack in a shutdown section, so as to rapidly activate the fuel cell stack.

That is, the present disclosure may rapidly activate the fuel cell stack by applying the high current to the fuel cell stack for a prescribed amount of time and then by repeating the shutdown section introduction process of pumping the hydrogen to the air electrode reaction surface several times for a prescribed amount of time.

It is possible to further shorten the total time required for activation and further reduce the amount of hydrogen used, by separately applying a high-current maintenance time and a shutdown maintenance time according to the activity (%) of the fuel cell stack.

The process of applying the high current to the stack and a shutdown process of pumping the hydrogen to the air electrode reaction surface in the shutdown state of the fuel cell stack are repeated. In this case, the high-current application and shutdown processes are performed for a shorter time (about 3 to 5 seconds) in an initial stage of stack activation, and are then performed for a longer time (about 65 to 75 seconds, preferably 70 seconds) by gradually increasing the time in a later stage of the stack activation.

In more detail, a method (rapid pulse method), in which a high-current application time and a shutdown maintenance time for pumping the hydrogen to the air electrode reaction surface are maintained for a shorter period of time, is used in an initial stage of stack activation, that is, in the stage in which the fuel cell stack has a low activity %, in order to increase activation of a catalyst layer in the fuel cell stack. In contrast, a method, in which the high-current application time and the shutdown maintenance time are maintained for a longer period of time, is used in a later stage of stack activation, that is, in the stage in which the fuel cell stack has a high activity %, in order to improve an ionic conductivity of an electrolyte membrane in the fuel cell stack.

When the high-current application time and the shutdown maintenance time are maintained for a short period of time, activation of a catalyst (remove surface impurities or reduce oxides) is restored in the fuel cell stack due to a rapid potential injection pulse for the fuel cell stack.

When the high-current application time and the shutdown maintenance time are maintained for a long period of time, it is possible to effectively wet the electrolyte membrane since an ion path is smoothly formed by rearrangement of a sulfonic acid group on the electrolyte membrane.

The pumping of the hydrogen to the air electrode reaction surface includes a process of shutting off supply of oxygen to an air electrode and simultaneously supplying the hydrogen to a fuel electrode in the shutdown state of the fuel cell stack, a reaction process ($H_2 \rightarrow 2H^+ + 2e^-$) in which the hydrogen is dissociated into hydrogen cations and electrons in the fuel electrode, and a reaction process ($2H^+ + 2e^- \rightarrow H_2$) in which the dissociated hydrogen ions are transmitted to the air electrode through an electrolyte membrane and simultaneously, bonded again to the electrons transmitted to the air electrode through an external conducting wire so as to produce the hydrogen in the air electrode.

The cell potential may reach 0 V (SHE: hydrogen oxidation/reduction standard potential) by rapidly removing the oxygen remaining in the air electrode such that hydrogen is not mixed with oxygen in an air electrode reaction channel due to the oxygen remaining in the air electrode, during the shutdown maintenance time for pumping the hydrogen to the air electrode reaction surface. Thus, a mixed potential section, in which the hydrogen diffused from the hydrogen electrode is mixed with the remaining oxygen, is minimized in the air electrode. Therefore, dissociation between the electrolyte membrane and the binder is minimized by oxygen radicals produced by reaction of hydrogen and oxygen.

When the oxygen remaining in the air electrode is removed, it is possible to easily remove oxides from the surface of a platinum catalyst of the air electrode in a state in which a hydrogen reduction atmosphere is formed by pumping the hydrogen to the air electrode when a prescribed load (e.g. 0.1 A/cm$^2$) is constantly applied in a state in which the oxygen is fully removed from the air electrode reaction surface.

In order to rapidly remove the oxygen remaining in the air electrode, a high current (about 0.2 A/cm$^2$) needs to be applied before shutdown in a range in which an inverse voltage is not applied. The cell potential is rapidly dropped to 0 V by applying the high current, and thus the oxygen is removed.

When the reduction atmosphere is formed by pumping the hydrogen to the air electrode in the state in which the oxygen is removed from the air electrode and the prescribed load (e.g. 0.1 A/cm$^2$) is constantly applied to the fuel cell stack, it is possible to increase a reaction rate (kinetic rate) of oxide reduction on the surface of platinum catalyst contained in the air electrode by the hydrogen reduction atmosphere, and thus to accelerate the activation of an air electrode catalyst.

The hydrogen may be supplied by a pressurization method at a higher pressure than the typical hydrogen supply pressure when the hydrogen is supplied to the fuel electrode in a shutdown maintenance process of pumping the hydrogen to the air electrode reaction surface. Consequently, it is possible to produce more hydrogen in the air electrode and easily diffuse the hydrogen through the electrolyte membrane such that the air electrode catalyst is activated during the shutdown process.

In more detail, when more hydrogen is supplied to the fuel electrode by the pressurization method, it is possible to further increase the amount of hydrogen produced by dissociating the hydrogen into the hydrogen cations and electrons in the fuel electrode and then bonding the hydrogen cations and the electrons again in the air electrode. Thus, it is possible to further increase the reaction rate (kinetic rate) of the oxide reduction on the surface of platinum contained in the air electrode by the hydrogen reduction atmosphere in which more hydrogen is produced in the air electrode, thus to further accelerate activation of the air electrode catalyst.

In addition, the hydrogen pressurized by the above pressurization method is easily diffused through the electrolyte membrane during the shutdown process, and the diffused hydrogen together with the hydrogen produced in the air electrode effectively forms the reduction atmosphere of the air electrode.

When the prescribed load (e.g. 0.1 A/cm$^2$) is constantly applied after the shutdown maintenance process, a voltage of about 0.9 V per cell, which is lower than an open circuit voltage of about 1V per cell, is formed under the condition in which air is supplied to the air electrode. When the open circuit voltage is maintained for a relatively long period of time in the fuel cell activation process, the surfaces of platinum and carbon of the air electrode are oxidized, thereby further reducing the activity. However, it is possible to minimize deterioration of the activity of the fuel cell through avoidance of the open circuit voltage.

Examples in accordance with the present disclosure will be described below, but the present disclosure is not limited to the following Examples.

Example 1

The process of applying the high current to the stack, and the shutdown maintenance process of pumping the hydrogen to the air electrode reaction surface in the shutdown state of the stack are repeated. In this case, the high-current application and shutdown maintenance processes are performed for about 3 seconds and 5 seconds, respectively, in the initial stage of stack activation, and are then performed for about 70 seconds each by gradually increasing the time in the later stage of stack activation.

When the current (load) of 0.1 A/cm$^2$ or less is constantly applied while the hydrogen is pressurized and supplied in order to fully remove a portion of oxygen which remains in the air electrode in the shutdown section, the reduction atmosphere is formed by pumping the hydrogen to the air electrode. Thus, the oxides are easily removed from the surface of the platinum catalyst of the air electrode.

The total activation time according to Example 1 of the present disclosure is 35 minutes.

Example 2

In accordance with Example 2 of the present disclosure, the process of applying the high current to the stack, and the shutdown maintenance process of pumping the hydrogen to the air electrode reaction surface in the shutdown state of the stack are repeated. In this case, the high-current application process is performed for about 3 seconds in the initial stage of stack activation, and is then performed for about 70 seconds by gradually increasing the time in the later stage of stack activation. The shutdown maintenance process is performed for about 70 seconds in the initial stage of stack activation, and is then performed for about 5 seconds by gradually reducing the time in the later stage of stack activation. The activation is performed for 35 minutes.

Example 3

In accordance with Example 3 of the present disclosure, the process of applying the high current to the stack, and the shutdown maintenance process of pumping the hydrogen to the air electrode reaction surface in the shutdown state of the stack are repeated. In this case, the high-current application process is performed for about 70 seconds in the initial stage of stack activation, and is then performed for about 3 seconds by gradually reducing the time in the later stage of stack activation. The shutdown maintenance process is performed for about 5 seconds in the initial stage of stack activation, and is then performed for about 70 seconds by gradually increasing the time in the later stage of stack activation. The activation is performed for 35 minutes.

Example 4

In accordance with Example 4 of the present disclosure, the process of applying the high current to the fuel cell stack, and the shutdown maintenance process of pumping the hydrogen to the air electrode reaction surface in the shutdown state of the stack are repeated. The high-current application process is performed for about 70 seconds in the initial stage of stack activation, and is then performed for about 3 seconds by gradually reducing the time in the later stage of stack activation. In addition, the shutdown maintenance process is performed for about 70 seconds in the initial stage of the stack activation, and is then performed for about 5 seconds by gradually reducing the time in the later stage of the stack activation. The activation is performed for 35 minutes.

Comparative Example

In accordance with Comparative Example of the related art, high-current application and shutdown maintenance (no hydrogen pumping) times are 55 seconds and 70 seconds respectively. The activation process is similarly performed for 1 to 18 cycles, and the activation is performed for 50 minutes and 80 minutes.

TABLE 1

|  | Comparative Example | Example 1 | Example 2 | Example 3 | Example 4 |
|---|---|---|---|---|---|
| High-current application time change | 55 seconds (same), 1st cycle → 18th cycle | 3 seconds → 70 seconds | 3 seconds → 70 seconds | 70 seconds → 3 seconds | 70 seconds → 3 seconds |
| Shutdown maintenance time change | 70 seconds (same), 1st cycle → 18th cycle | 5 seconds → 70 seconds | 70 seconds → 5 seconds | 5 seconds → 70 seconds | 70 seconds → 5 seconds |
| Total activation time | 50 minutes | 35 minutes | 35 minutes | 35 minutes | 35 minutes |
| Activity (%) | 100% | 100% | 98% | 98% | N/A |

After the activation processes according to each Example and Comparative Example are performed, mean voltages after activation are measured. The result is illustrated in the above Table 1.

As seen in Table 1, as a result of activation performed for a total of 50 minutes in Comparative Example, a mean voltage after the stack activation is 0.620 V. A mean voltage after the stack activation for 35 minutes is 0.619V in Example 1 of the present disclosure.

That is, it may be seen that higher activation efficiency is achieved in Example 1 of the present disclosure when the high-current application and shutdown times are initially reduced and then gradually increased.

Figure 2:
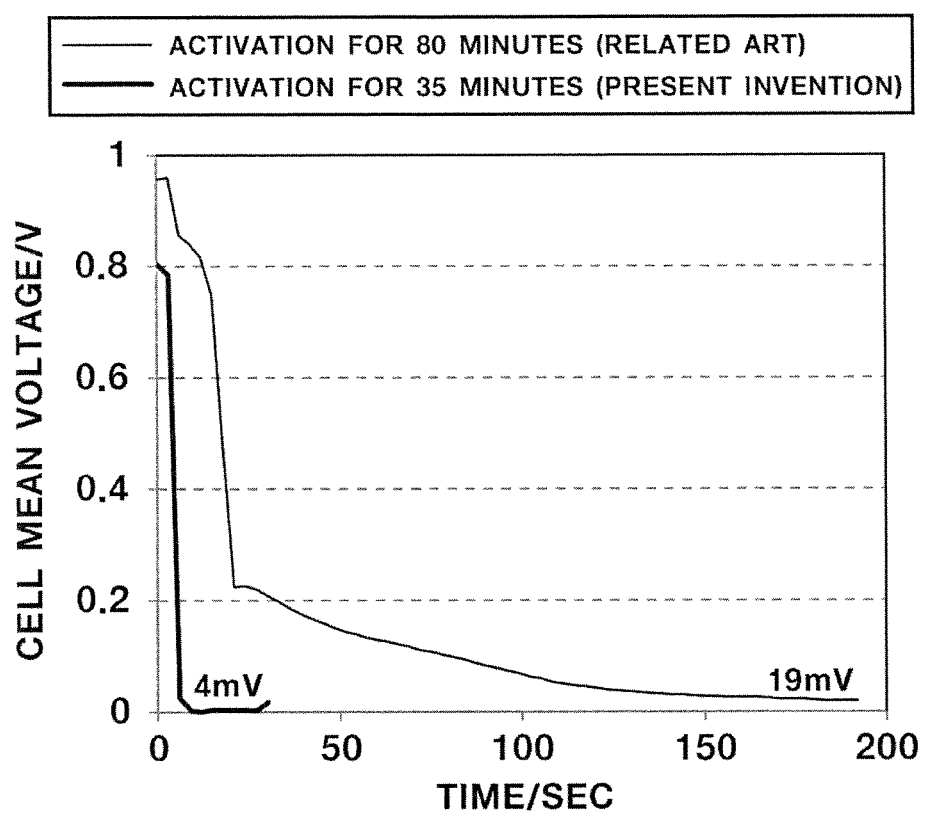
FIG. 2 is a graph comparing shutdown voltages in the method for accelerating activation of a fuel cell stack according to the embodiment of the present inventive concept and the conventional activation method.
Figure 3:
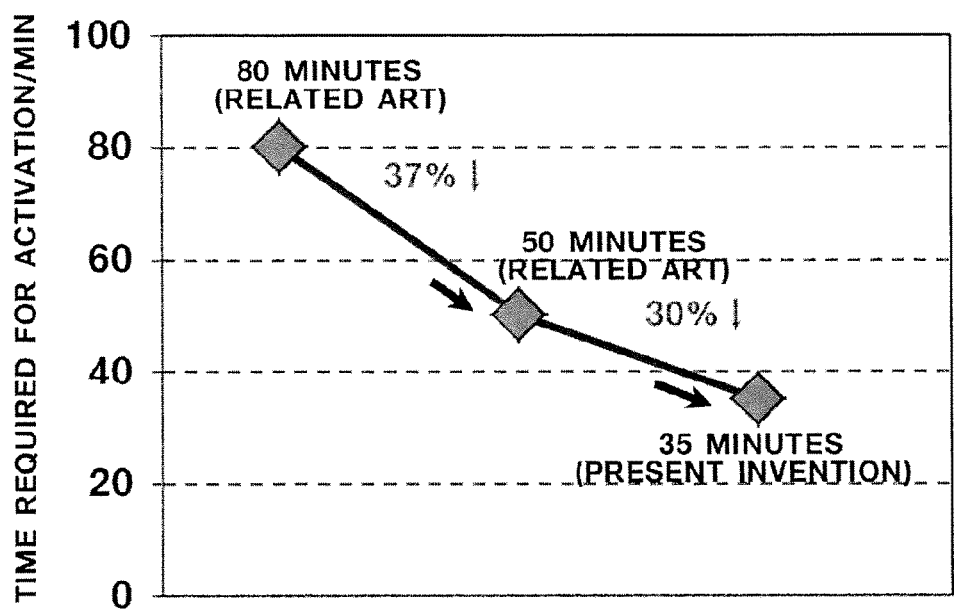
FIGS. 3 and 4 are graphs illustrating an activation time and a reduction effect of hydrogen in the method for accelerating activation of a fuel cell stack according to the embodiment of the present and the conventional activation method.

Therefore, in the method for accelerating activation of a fuel cell stack according to the present disclosure, a cell voltage drop rate during shutdown is faster compared to the related art as illustrated in FIGS. 1 to 3. Thus, the activation process may be performed within 35 minutes which is a significant time reduction compared to the activation time (50 minutes or 80 minutes) of Comparative Example.

Figure 4:
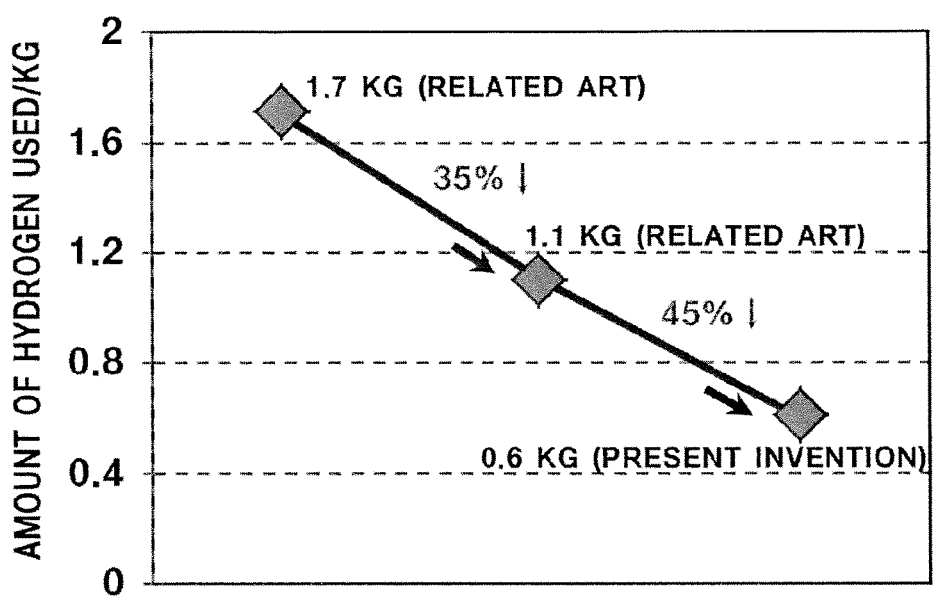

In addition, since the stack activation time is significantly reduced, it is possible to significantly reduce the amount of hydrogen that is consumed compared to the related art, as illustrated in FIG. 4.

The present disclosure provides the following effects through the above exemplary embodiment.

1) The cell voltage drop rate during the shutdown process may be faster compared to the related art, and thus, the activation time may be significantly reduced compared to the related art, by repeating the process of applying the high current to the fuel cell stack and the process of shutting down the fuel cell stack and introducing the process of pumping the hydrogen to the air electrode reaction surface of the stack during the shutdown process.

2) In addition, since the stack activation time is significantly reduced, it is possible to significantly reduce the amount of hydrogen that is consumed.

3) Furthermore, since the stack activation time is significantly reduced even though the amount of time during which the activation equipment has to be used is relatively long, it is possible to increase the production of fuel cell stacks.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for accelerating activation of a fuel cell stack, in which a process of applying a current to the fuel cell stack for a prescribed amount of time and a shutdown maintenance process of pumping hydrogen to an air electrode reaction surface for a prescribed amount of time are repeated plural times,
    wherein the process of applying the current to the fuel cell stack and the shutdown maintenance process of pumping the hydrogen to the air electrode reaction surface are performed for a shorter period of time in an initial stage of the fuel cell stack activation, and are then performed for a longer period of time by gradually increasing the time in a later stage of fuel cell stack activation.

2. The method of claim 1, wherein the process of applying the current to the fuel cell stack and the shutdown maintenance process of pumping the hydrogen to the air electrode reaction surface are performed for 3 to 5 seconds in an initial stage of the fuel cell stack activation, and are then performed for 65 to 75 seconds by gradually increasing the time in a later stage of fuel cell stack activation.

3. The method of claim 1, wherein the shutdown maintenance process comprises:
    a process of shutting off supply of oxygen to an air electrode and supplying the hydrogen to a fuel electrode in a shutdown state of the fuel cell stack;
    a reaction process ($H_2 \rightarrow 2H^+ + 2e^-$) in which the hydrogen is dissociated into hydrogen cations and electrons in the fuel electrode; and
    a reaction process ($2H^+ + 2e^- \rightarrow H_2$) in which the dissociated hydrogen cations and electrons are transmitted to the air electrode through an electrolyte membrane and are again bonded to the electrons transmitted to the air electrode through an external conducting wire to produce hydrogen in the air electrode.

4. The method of claim 3, wherein the hydrogen is pumped to the air electrode by the shutdown maintenance process to form a hydrogen reduction atmosphere, and oxides are removed from a surface of platinum contained in the air electrode by the hydrogen reduction atmosphere when a prescribed load is constantly applied to the fuel cell stack.

5. The method of claim 1, wherein the hydrogen is pumped to an air electrode by the shutdown maintenance process to form a hydrogen reduction atmosphere, and oxides are removed from a surface of platinum contained in the air electrode by the hydrogen reduction atmosphere when a prescribed load is constantly applied to the stack.

6. The method of claim 5, wherein the prescribed load is 0.1 A/cm$^2$.

7. The method of claim 1, wherein, in the shutdown maintenance process, a hydrogen pressurization method, in which the hydrogen is supplied at a higher pressure than a threshold pressure, is used in order to remove oxygen remaining in an air electrode by diffusing the hydrogen from an anode to a cathode side through membrane inside the fuel cell stack.

8. The method of claim 1, wherein, in the shutdown maintenance process, a section, in which oxygen remaining in an air electrode is mixed with hydrogen diffused from a hydrogen electrode, is removed in order to prevent dissociation of an electrolyte membrane or a binder, which may occur during the fuel cell stack activation.

9. The method of claim 1, wherein an open circuit voltage is avoided under a condition in which air is supplied to an air electrode to prevent surface oxidation of platinum and carbon of the air electrode, by constantly applying a prescribed load after the shutdown maintenance process.

10. The method of claim 1, wherein the current is $0.2$ $A/cm^2$ or higher.

\* \* \* \* \*